United States Patent
Newman et al.

(10) Patent No.: US 12,387,375 B1
(45) Date of Patent: Aug. 12, 2025

(54) DYNAMIC LENS CALIBRATION

(71) Applicant: GoPro, Inc., San Mateo, CA (US)

(72) Inventors: David Newman, Del Mar, CA (US); Sean Hamilton, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 175 days.

(21) Appl. No.: 18/359,799

(22) Filed: Jul. 26, 2023

(51) Int. Cl.
  *G06T 7/80* (2017.01)
  *G06K 7/14* (2006.01)
  *H04N 23/67* (2023.01)
  *H04N 23/695* (2023.01)

(52) U.S. Cl.
  CPC .............. *G06T 7/80* (2017.01); *G06K 7/1443* (2013.01); *H04N 23/67* (2023.01); *H04N 23/695* (2023.01)

(58) Field of Classification Search
  CPC ........ G06T 7/80; G06K 7/1443; H04N 23/67; H04N 23/695; G02B 21/362; G02B 7/022; G02B 7/023; G02B 21/0008; G02B 21/26
  See application file for complete search history.

(56) References Cited

U.S. PATENT DOCUMENTS

| | | | | |
|---|---|---|---|---|
| 5,956,184 A | * | 9/1999 | Sato | G02B 15/145121 359/683 |
| 2020/0400948 A1 | * | 12/2020 | Maric | G02B 27/017 |
| 2022/0286611 A1 | * | 9/2022 | Tsairi | H04N 23/6812 |
| 2023/0393378 A1 | * | 12/2023 | Chen | G02B 21/26 |

* cited by examiner

*Primary Examiner* — Christopher K Peterson
(74) *Attorney, Agent, or Firm* — Esplin & Associates, PC

(57) ABSTRACT

An image capture device may detect depiction of a machine-readable optical code within visual content captured by the image capture device. The machine-readable optical code may convey information for lens calibration with another lens attached over the lens of the image capture device. Attachment of the other lens over the lens of the image capture device may change optical properties (e.g., field of view, focus distance, depth of focus, and/or distortion) of the image capture device. The image capture device may perform lens calibration based on the information for lens calibration conveyed by the machine-readable optical code. The image capture device may be dynamically calibrated to capture visual content through the combination of the lens and other lens attached over the lens.

20 Claims, 6 Drawing Sheets focus distance 410 image capture device 400 focus distance 420 image capture device 400

DYNAMIC LENS CALIBRATION

FIELD

This disclosure relates to dynamically performing lens calibration for an image capture device with additional lens(es) attached to the image capture device.

BACKGROUND

An image capture device that captures visual content though a lens may have a minimal focusing distance. Subjects closer to the image capture device than the minimal focusing distance may not be focused. Other lens(es) (e.g., macro lenses) may be attached on top of the lens of the image capture device to change the minimal focusing distance. However, the image capture device may not be calibrated to capture visual content through other lens(es).

SUMMARY

This disclosure relates to dynamic lens calibration. An image capture device may include a housing. The housing may carry one or more of a lens, an image sensor, a processor, and/or other components. The lens may guide light within a field of view to the image sensor. The lens may have a focus distance. The image sensor may generate a visual output signal conveying visual information defining visual content based on light that becomes incident thereon. Depiction of a machine-readable optical code within the visual content may be detected. The machine-readable optical code may convey information for lens calibration with another lens attached over the lens. Attachment of the other lens over the lens may result in a different focus distance. Lens calibration for visual content capture may be performed based on the information for lens calibration conveyed by the machine-readable optical code and/or other information.

A housing may carry one or more components of an image capture device. The housing may carry (be attached to, support, hold, and/or otherwise carry) one or more of an electronic storage, a lens, an image sensor, a processor, and/or other components. The electronic storage may store information relating to the image capture device, information relating to components of the image capture device, visual information, information relating to capture of content by the image capture device, information relating to visual content captured by the image capture device, information relating to other content captured by the image capture device, information relating to one or more lenses of/attached to the image capture device, information relating to machine readable optical codes, information relating to lens calibration, and/or other information.

The lens may be configured to guide light within a field of view to the image sensor. The field of view may be less than 180 degrees. The field of view may be equal to 180 degrees. The field of view may be greater than 180 degrees. The lens may have a first focus distance. The first focus distance of the lens may be the minimum focusing distance. In some implementations, the lens may include a wide-angle lens. One or more other lenses may be attached over the lens. Attachment of other lens(es) over the lens may change the focus distance. Attachment of other lens(es) over the lens may result in second focus distance different from the first focus distance. The second focus distance may be shorter than the first focus distance.

The image sensor may be configured to generate a visual output signal and/or other output signals based on light that becomes incident thereon and/or other information. The visual output signal may convey visual information and/or other information. The visual information may define visual content having the field of view.

The processor(s) may be configured by machine-readable instructions. Executing the machine-readable instructions may cause the processor(s) to facilitate dynamic lens calibration. The machine-readable instructions may include one or more computer program components. The computer program components may include one or more of a detection component, a calibration component, and/or other computer program components.

The detection component may be configured to detect depiction of one or more machine-readable optical codes within the visual content. The machine-readable optical code(s) may convey information for lens calibration and/or other information. The machine-readable optical code(s) may convey information for lens calibration with one or more other lenses attached over the lens of the image capture device. The attachment of the other lens(es) over the lens of the image capture device may change the focus distance of the image capture device. The attachment of the other lens(es) over the lens of the image capture device may result in a second focus distance different from the first focus distance of the lens. The second focus distance may be shorter than the first focus distance.

In some implementations, the machine-readable optical code(s) may include one or more QR codes.

In some implementations, the image capture device may further include one or more electronic displays. One or more visual representations for the machine-readable optical code(s) may be presented on the electronic display(s). The visual representation(s) may be presented on the electronic display(s) to facilitate orientation of the image capture device/housing to the machine-readable optical code(s). The orientation of the image capture device/housing to the machine-readable optical code(s) may include distance between the image capture device/housing and the machine-readable optical code(s), rotation of the image capture device/housing with respect to the machine-readable optical code(s), and/or other orientation of the image capture device/housing to the machine-readable optical code(s).

The calibration component may be configured to perform lens calibration for the image capture device. The calibration component may be configured to perform lens calibration for visual content capture by the image capture device. The lens calibration for visual content capture may be performed based on the information for lens calibration conveyed by the machine-readable optical code(s). The information for lens calibration conveyed by the machine-readable optical code(s) may prompt/cause the lens calibration to be performed.

In some implementations, the lens calibration for visual content capture may include determination of lens parameters for capture of the visual content through a combination of the lens and the other lens(es). In some implementations, the lens calibration for visual content capture may include determination of lens parameters for stabilization, horizon leveling, and/or rolling shutter correction.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
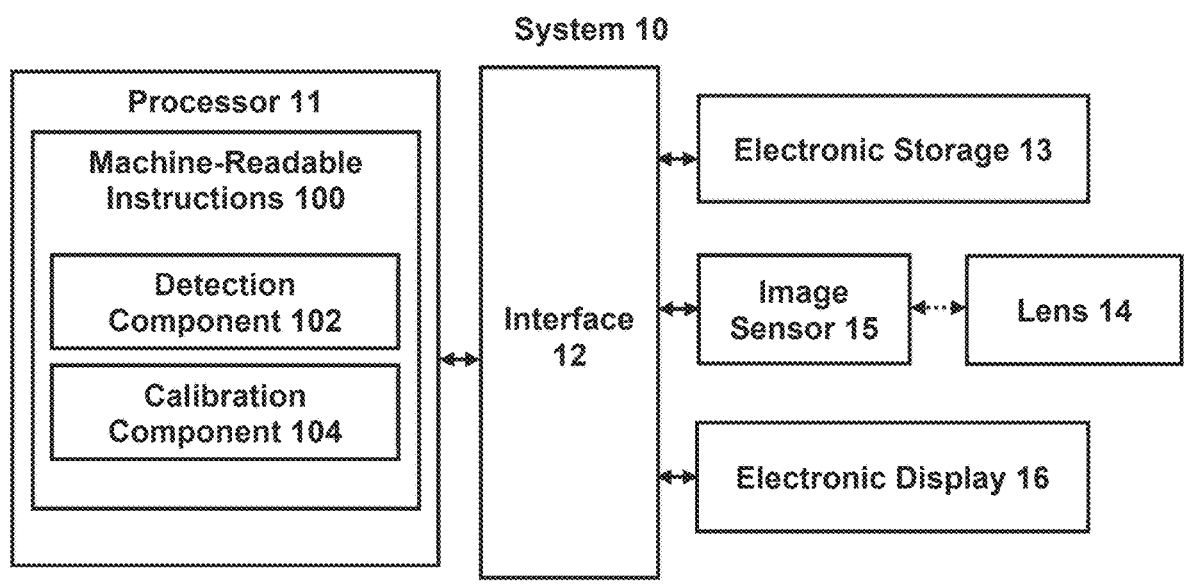
FIG. 1 illustrates an example system for dynamic lens calibration.

FIG. 1 illustrates a system 10 for dynamic lens calibration. The system 10 may include one or more of a processor 11, an interface 12 (e.g., bus, wireless interface), an electronic storage 13, a lens 14, an image sensor 15, an electronic display 16, and/or other components. The system 10 may include and/or be part of an image capture device. The image capture device may include a housing, and one or more of the processor 11, the interface 12, electronic storage 13, the lens 14, the image sensor 15, the electronic display 16, and/or other components of the system 10 may be carried by the housing of the image capture device. The lens 14 may guide light within a field of view to the image sensor 15. The lens 14 may have a focus distance. The image sensor 15 may generate a visual output signal conveying visual information defining visual content based on light that becomes incident thereon.

Depiction of a machine-readable optical code within the visual content may be detected by the processor 11. The machine-readable optical code may convey information for lens calibration with another lens attached over the lens. Attachment of the other lens over the lens may result in a different focus distance. Lens calibration for visual content capture may be performed by the processor 11 based on the information for lens calibration conveyed by the machine-readable optical code and/or other information.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to the image capture device, information relating to components of the image capture device, visual information, information relating to capture of content by the image capture device, information relating to visual content captured by the image capture device, information relating to other content captured by the image capture device, information relating to one or more lenses of/attached to the image capture device, information relating to machine readable optical codes, information relating to lens calibration, and/or other information.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the electronic storage 13, the lens 14, and/or the image sensor 15, of the system 10 may be carried by the housing of the image capture device. The housing of the image capture device may carry other components of the system 10, such as the processor 11. References to a housing of an image capture device may refer to the image capture device, and vice versa.

An image capture device may refer to a device configured to captures visual content. An image capture device may capture visual content in the form of images, videos, and/or other forms. An image capture device may refer to a device for recording visual information in the form of images, videos, and/or other media. An image capture device may be a standalone device (e.g., camera, action camera, image sensor) or may be part of another device (e.g., part of a smartphone, tablet).

Figure 3A:
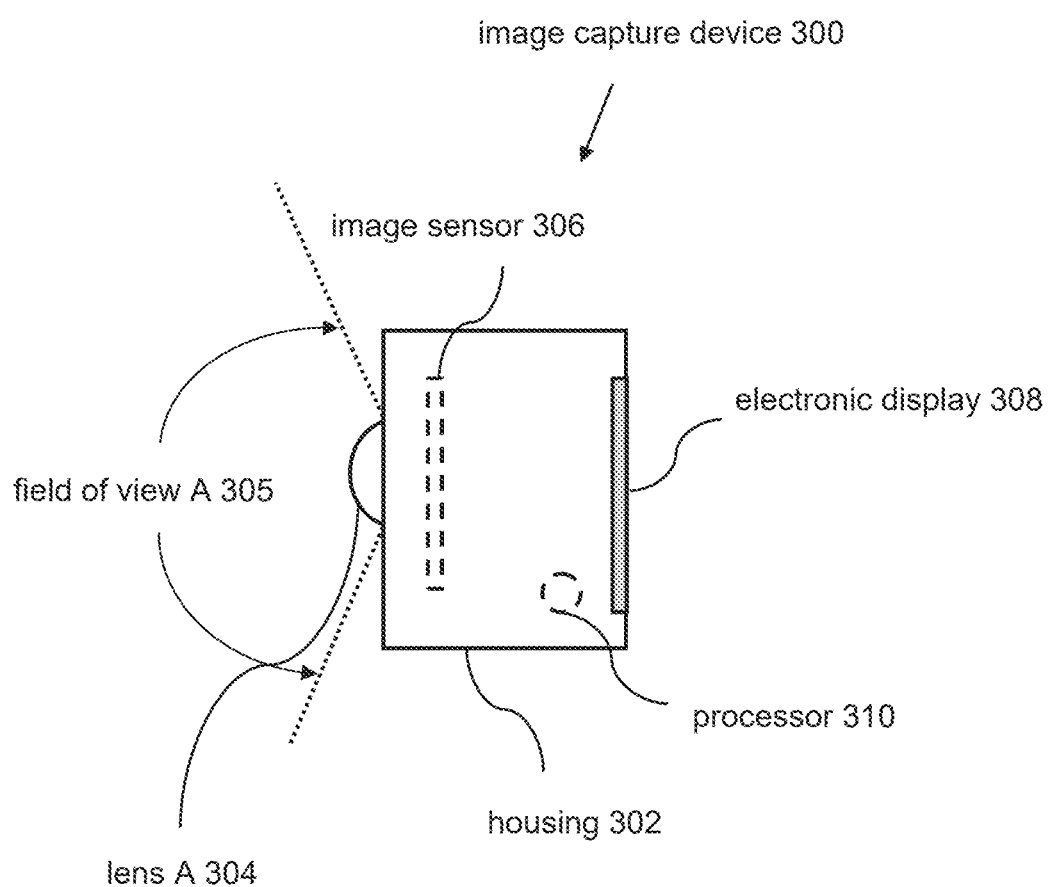
FIG. 3A illustrates an example image capture device.

FIG. 3A illustrates an example image capture device 300. Visual content (e.g., of image(s), video frame(s)), audio content, metadata relating to the visual content and/or audio content, and/or other content may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry one or more components of the image capture device 300. The housing 302 may carry (be attached to, support, hold, and/or otherwise carry) one or more of a lens A 304, an image sensor 306, an electronic display 308, a processor 310, and/or other components.

One or more components of the image capture device 300 may be the same as, be similar to, and/or correspond to one or more components of the system 10. For example, the processor 310 may be the same as, be similar to, and/or correspond to the processor 11. The lens A 304 may be the same as, be similar to, and/or correspond to the lens 14. The image sensor 306 may be the same as, be similar to, and/or correspond to the image sensor 15. The electronic display 308 may be the same as, be similar to, and/or correspond to the electronic display 16. The image capture device 300 may include other components not shown in FIG. 3. The image capture device 300 may not include one or more components shown in FIG. 3. Other configurations of image capture devices are contemplated.

The lens A 304 may include instrument(s), tool(s), and/or medium that acts upon light passing through the instrument(s)/tool(s)/medium. The lens A 304 may affect direction, deviation, and/or path of the light passing through the lens 304 A. The lens A 304 may have a field of view A 305. The lens A 304 may be configured to guide light within the field of view A 305 to the image sensor 306.

The field of view A 305 may include the field of view of a scene that is within the field of view of the lens A 304 and/or the field of view of the scene that is delivered to the image sensor 306. For example, the lens A 304 may guide light within its field of view to the image sensor 306 or may guide light within a portion of its field of view to the image sensor 306. The field of view A 305 of the lens A 304 may refer to the extent of the observable world that is seen through the lens A 304. The field of view A 305 of the lens A 304 may include one or more angles (e.g., vertical angle, horizontal angle, diagonal angle) at which light is received and passed on by the lens A 304 to the image sensor 306. For example, the lens 14 may include a wide-angle lens. A wide-angle lens may refer to a lens with a short focal length and a wide field of view. A wide angle lens may refer to a lens with a field of view greater than a threshold field of view. In some implementations, the field of view A 305 may be greater than 180-degrees. In some implementations, the field of view A 305 may be less than 180-degrees. In some implementations, the field of view A 305 may be equal to 180-degrees.

In some implementations, the image capture device 300 may include multiple lenses. For example, the image capture device 300 may include multiple lenses that are arranged on the housing 302 to capture spherical images/videos (guide light within spherical field of view to one or more images sensors). For instance, the image capture device 300 may include two lenses positioned on opposing sides of the housing 302. The fields of views of the lenses may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The lens A 304 may be configured to guide light within the field of view A 305 to the image sensor 306, and the image sensor 306 may be configured to generate visual output signals conveying visual information based on light that becomes incident thereon via the lens A 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 300 may include multiple image sensors. For example, the image capture device 300 may include multiple image sensors carried by the housing 302 to capture spherical images/videos based on light guided thereto by multiple lenses. For instance, the image capture device 300 may include two image sensors configured to receive light from two lenses positioned on opposing sides of the housing 302. The fields of views of the lenses may overlap and enable capture of spherical images and/or spherical videos.

The image capture device 300 may include other sensors. For example, the image capture device 300 may include one or more sound sensors (e.g., microphones) to capture audio content, one or more location sensors (e.g., GPS sensors) to measure location of the image capture device, one or more position sensors (e.g., gyroscope, accelerometer, inertial measurement unit) to measure position, movement, and/or orientation of the image capture device, and/or other sensors. In some implementations, information about location, position, and/or movement of the image capture device may be stored as metadata of other content (e.g., visual content, audio content) captured by the image capture device.

The electronic display 308 may include an electronic device that provides visual presentation of information. The electronic display 308 may include a color display and/or a non-color display. The electronic display 308 may be configured to visually present information. The electronic display 308 may be configured to present visual content, user interface, and/or other information. User interface (graphical user interface) may include a graphical form that enables a user to interact with the image capture device 300 and/or see information provided by the image capture device 300. In some implementations, the electronic display 308 may include a touchscreen display.

The processor 310 may include one or more processors (logic circuitry) that provide information processing capabilities in the image capture device 300. The processor 310 may provide one or more computing functions for the image capture device 300. The processor may operate/send command signals to one or more components of the image capture device to operate the image capture device. For example, the processor 310 may facilitate operation of the image capture device 300 in capturing image(s) and/or video(s), facilitate operation of the lens 304 (e.g., change how light is guided by the lens 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component. The processor 310 may obtain information from other sensor(s) and/or facilitate transfer of information from other sensor(s) to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

The processor 310 may detect depiction of one or more machine-readable optical codes within the visual content captured by the image capture device 300. The machine-readable optical code may convey information for lens calibration with one or more other lenses attached over the lens 14. Attachment of the other lens(es) over the lens 14 may result in a different focus distance for the image capture device. Attachment of the other lens(es) over the lens 14 may change the focus distance of the image capture device 300. The processor 310 may perform lens calibration for visual content capture based on the information for lens calibration conveyed by the machine-readable optical code (s) and/or other information. The image capture device 300 may be dynamically calibrated to capture visual content through the combination of the lens 14 and other lens(es) attached over the lens 14.

One or more lenses may be attached over the lens 14 and/or other lens(es) of the image capture device 300. Attachment of a lens over another lens may include the lens being positioned/fixed so that the lens is on top of the other lens. Attachment of a lens over another lens may include the lens being positioned/fixed so that the lens is covering the other lens. Attachment of a lens over another lens may include the lens being positioned/fixed so that light first enters the lens before entering the other lens. Attachment of a lens over another lens may or may not include physical contact between the two lenses. A lens may be directly and/or indirectly attached to another lens. For example, a lens may be directly attached to the other lens via physical contact with the other lens. As another example, a lens may be indirectly attached to the other lens via physical contact with the housing 302 of the image capture device 300. For instance, the one or more lenses may be attached to (e.g., joined to, fastened to, combined with) the housing 302 so that the other lens(es) are over (e.g., on top of, covering) the lens 14.

Figure 3B:
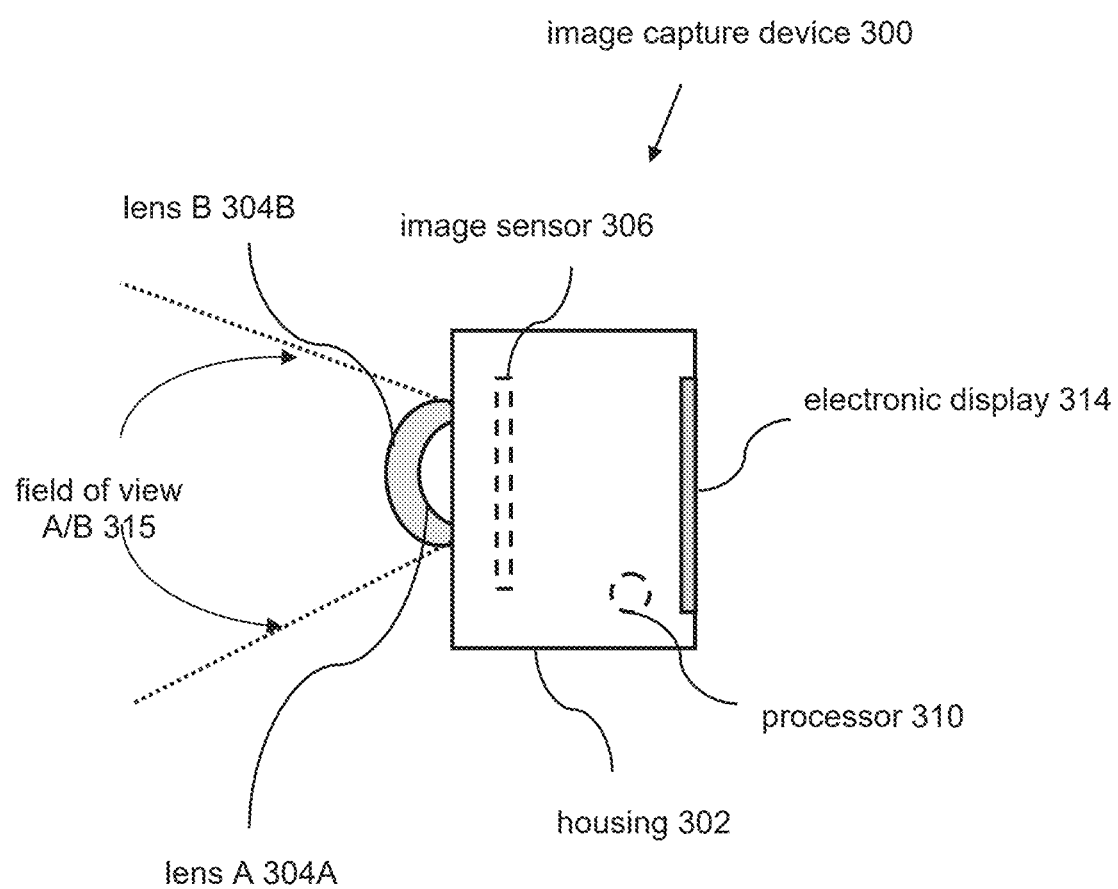
FIG. 3B illustrates an example image capture device.

In some implementations, attachment of other lens(es) over the lens 14 may change the field of view of the image capture device 300. Attachment of other lens(es) over the lens 14 may change the field of view through which visual content is captured by the image capture device 300. The attachment of other lens(es) over the lens 14 may increase or decrease the field of view of the image capture device 300. For example, FIG. 3B shows the image capture device with a lens B 304B attached over the lens A 304A. The attachment of the lens B 304B over the lens A 304A may reduce the field of view of the image capture device 300 from the field of view A 305 (shown in FIG. 3A) to a field of view A/B 315.

Attachment of other lens(es) over the lens 14 may change the focus distance of the image capture device 300. Attachment of other lens(es) over the lens 14 may change the focus distance with which visual content is captured by the image capture device 300. The attachment of other lens(es) over the lens 14 may increase or decrease the focus distance of the image capture device 300. The focus distance of the image capture device 300 may refer to the focus distance of the lens(es) through which visual content is captured. The focus distance of the image capture device 300 may refer to the distance from the focusing plane (e.g., the image sensor 306) to a subject in focus. The focus distance of the image capture device 300 may refer to the distance from the image capture device 300 at which subjects within the field of view are in focus. The focus distance of the image capture device 300 may be the minimum focusing distance of the image capture device 300. The minimum focusing distance of the image capture device 300 may be the shortest distance from the focusing plane to a subject in focus. The minimum focusing distance of the image capture device 300 may be the shortest distance between the image capture device 300 and a subject with the subject still in focus. The image capture device 300 may be unable to focus on subjects closer to the image capture device 300 than the minimum focusing distance. Subjects closer to the image capture device 300 than the minimum focusing distance may be blurred.

Figure 4:
FIG. 4 illustrates an example change in focus distance of an image capture device.
Figure 4:
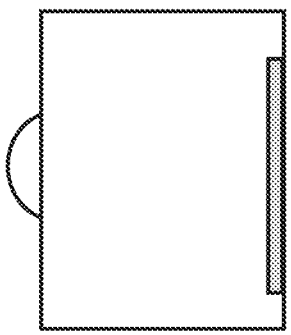
Figure 4:
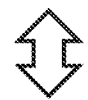
Figure 4:
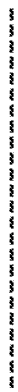
Figure 4:
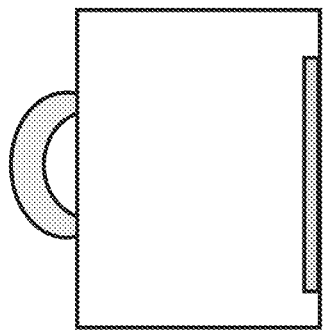

FIG. 4 illustrates an example change in focus distance of an image capture device 400. The image capture device 400 may be the same as be the same as or similar to the image capture device 300. The image capture device 400 may initially have a focus distance 410. The focus distance 410 of the image capture device may be a property of the lens through which the image capture device 400 captures visual content. One or more lenses may be attached over the lens of the image capture device 400. The attachment of other lens(es) over the lens may result in a change in the focus distance of the image capture device 400. For example, a macro lens may be attached over the lens and the focus distance of the image capture device 400 may change from the focus distance 410 to the focus distance 420. The focus distance 420 may be shorter than the focus distance 410.

Attachment of other lens(es) over the lens 14 may change other optical properties of the image capture device 300. For example, attachment of other lens(es) over the lens 14 may change the depth of focus with which visual content is captured by the image capture device 300. The attachment of other lens(es) over the lens 14 may increase or decrease the depth of focus of the image capture device 300. Attachment of other lens(es) over the lens 14 may change the distortion with which visual content is captured by the image capture device 300. The attachment of other lens(es) over the lens 14 may change the type and/or amount of distortion within the visual content captured by the image capture device 300. Other changes in optical properties of the image capture device 300 are centiamp.

The image capture device may not be calibrated to capture visual content with other lens(es) attached over the lens of the image capture device. The attachment of the lens(es) over the lens of the image capture device may change the optical properties (e.g., field of view, focus distance, depth of focus, distortion) of the image capture device, and the image capture device may not be calibrated to capture visual content with the changed optical properties. Change in the optical properties of the image capture device may degrade the performance/functioning of the image capture device. For example, the lens parameters of the image capture device may be calibrated based on optical properties of the image capture device with just the lens of the image capture device. Changes in optical properties of the image capture device without corresponding changes in lens parameters of the image capture device may result in stabilization, horizon leveling, and/or rolling shutter correction being inaccurately performed.

The present disclosure enables dynamic calibration of an image capture device with another lens attached over the lens of the image capture device. After the other lens has been attached over the lens of the image capture device, lens calibration is performed. The lens calibration process may be started based on the image capture device scanning a machine-readable optical code. For example, the image capture device may capture an image that depicts the machine-readable optical code. The machine-readable optical code may convey information for lens calibration with another lens attached over the lens of the image capture device. The information for lens calibration conveyed by the machine-readable optical code may prompt/cause the lens calibration to be performed by the image capture device.

The machine-readable optical code may be presented for capture by the image capture device. For example, the machine-readable optical code may be printed on a medium, such as paper, or shown on an electronic display. The machine-readable optical code may be presented with information to facilitate lens calibration, such as calibration pattern for use in the lens calibration and/or information on how the lens calibration is to be performed. Images being captured by the image capture device may be presented on an electronic display to facilitate orientation of the image capture device to the machine-readable optical code. For example, a live preview of the visual content being captured by the image capture device may be presented with an outline of how the machine-readable optical code should be positioned within the visual content. Alignment of the machine-readable optical code to the outline may result in proper orientation of the image capture device to the machine-readable optical code. Alignment of the machine-readable optical code to the outline may result in proper orientation of the image capture device to information presented to facilitate lens calibration (e.g., proper orientation of the image capture device to calibration pattern).

The lens calibration process may be automatically performed by the image capture device. The lens calibration process may instruct the user on how the lens calibration is to be performed. The dynamic calibration of the image capture device may enable the image capture device to perform/function properly with other lens attached over the lens of the image capture device. For example, the dynamic calibration of the image capture device may result in accurate performance of stabilization, horizon leveling, and/or rolling shutter correction.

Lens calibration with the other lens attached over the lens may be stored in permanent memory of the image capture device. Lens calibrations with different lenses attached over the lens may be stored in permanent memory of the image capture device. Stored lens calibrations may be used to enable the image capture device to operate with other lenses attached over the lens of the image capture device without having to re-perform the lens calibration.

Referring back to FIG. 1, the processor 11 (or one or more components of the processor 11) may be configured to obtain information to facilitate dynamic lens calibration. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate dynamic lens calibration. The machine-readable instructions 100 may include one or more computer program components. The machine-readable instructions 100 may include one or more of a detection component 102, a calibration component 104, and/or other computer program components.

The detection component 102 may be configured to detect depiction of one or more machine-readable optical codes within the visual content. Detecting depiction of a machine-readable optical code within visual content may include one or more of determining, discerning, discovering, finding, identifying, spotting, and/or otherwise detecting the depiction of the machine-readable optical code within the visual content. Detecting depiction of a machine-readable optical code within visual content may include determining that the visual content depicts the machine-readable optical code. Depiction of a machine-readable optical code may be depicted within visual content of one or more images/video frames.

Depiction of machine-readable optical code(s) within visual content may be detected based on analysis of the visual content and/or other information. Analysis of the visual content may include examination, evaluation, processing, studying, and/or other analysis of the visual content. For example, analysis of the visual content may include examination, evaluation, processing, studying, and/or other analysis of one or more visual features/characteristics of the visual content. Analysis of the visual content may include object/pattern recognition. Analysis of the visual content may include analysis of visual content of a single image/video frame and/or analysis of visual content of multiple images/multiple video frames. For example, visual features and/or visual characteristics of a single image may be analyzed to determine whether the single image depict a machine-readable optical code. Visual features and/or visual characteristics of multiple images may be analyzed to determine whether the multiple images depict a machine-readable optical code.

The machine-readable optical code(s) may convey information for lens calibration and/or other information. The machine-readable optical code(s) may convey information for lens calibration with other lens(es) attached over the lens(es) of the image capture device. The machine-readable optical code(s) may convey information for lens calibration with additional lens(es) attached over the lens(es) of the image capture device. The attachment of other lens(es) over the lens(es) of the image capture device may change the optical properties of the image capture device, such as the field of view, the focus distance, the depth of focus, and/or the distortion of the image capture device. The attachment of other lens(es) over the lens(es) of the image capture device may change the optical properties with which the image capture device captures visual content.

A machine-readable optical code may include a visual representation of data. The visual representation of data may be readable by the image capture device based on capture of an image/video including the machine-readable optical code. A machine-readable optical code may encode the data visually by varying the size and shape of patterns within the machine-readable optical code. The data may be encoded within a machine-readable optical code using one or more encoding modes.

In some implementations, a machine-readable optical code may include a one-dimensional machine-readable optical code (e.g., continuous or discrete barcodes), a two-dimensional machine-readable optical code (e.g., QR code), and/or a three-dimensional machine-readable optical code (e.g., holograms). In some implementations, a machine-readable optical code may include one or more varying components (e.g., a barcode/QR code/hologram that changes with time/location). Other dimensions and types of machine-readable optical codes are contemplated.

A machine-readable optical code conveying information for lens calibration with a lens attached over a lens of the image capture device may include the machine-readable optical code conveying information to prompt/cause the lens calibration to be performed by the image capture device and/or conveying information to be used in the lens calibration. For example, a machine-readable optical code may convey information that instructs the image capture device to start the lens calibration or to ask the user (e.g., via information presented on an electronic display of the image capture device) whether the lens calibration should be performed. A machine-readable optical code may convey information that informs the image capture device that additional lens(es) have been attached over the lens(es) of the image capture device. A machine-readable optical code may convey information that informs the image capture device on one or more specifics of the lens calibration to be performed by the image capture device. Conveyance of other information by a machine-readable optical code is contemplated.

Figure 5:
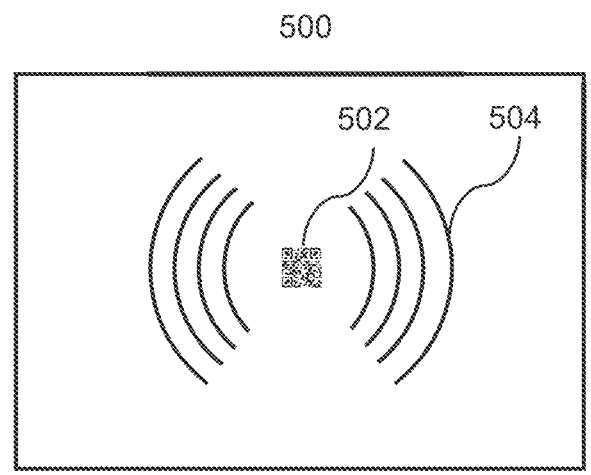
FIG. 5 illustrates an example image depicting a machine-readable optical code and calibration pattern.

A machine-readable optical code may be presented with information to facilitate lens calibration, such as calibration pattern for use in the lens calibration and/or information on how the lens calibration is to be performed. For example, FIG. 5 illustrates an example image 500 depicting a machine-readable optical code 502 and calibration pattern 504. The image may be captured by an image capture device. The machine-readable optical code 502 may convey information for lens calibration. The information conveyed by the machine-readable optical code 502 may prompt/cause the lens calibration to be performed by the image capture device that captured the image 500. The image capture device may use the calibration pattern 502 to perform the lens calibration. The image capture device may use the calibration pattern 502 to determine optical properties of the image capture device (e.g., optical properties with lens(es) attached over the lens(es) of the image capture device). Other types of optical codes and calibration patterns are contemplated.

In some implementations, the image capture device may further include one or more electronic displays. One or more visual representations for the machine-readable optical code(s) may be presented on the electronic display(s). The visual representation(s) may be presented on the electronic display(s) to facilitate orientation of the image capture device/housing to the machine-readable optical code(s). The orientation of the image capture device/housing to the machine-readable optical code(s) may include relative positioning of the image capture device/housing with respect to the machine-readable optical code(s). For example, the orientation of the image capture device/housing to the machine-readable optical code(s) may include the distance between the image capture device/housing and the machine-readable optical code(s), the rotation of the image capture device/housing with respect to the machine-readable optical code(s), and/or other orientation of the image capture device/housing to the machine-readable optical code(s).

For example, referring to FIG. 5, the image capture device may need to know the distance between the calibration pattern 502 and the image capture device for lens calibration to be properly/accurately performed. There may be a standard distance at which the calibration pattern 502 should be positioned away from the image capture device. The visual representation(s) of the machine-readable optical code(s) may be presented on the electronic display(s) of the image capture device to facilitate positioning of the image capture device/housing with respect to the machine-readable optical code(s). The visual representation(s) of the machine-readable optical code(s) may be presented on the electronic display(s) of the image capture device to facilitate positioning of the image capture device/housing with respect to the machine-readable optical code(s) so that the calibration pattern 502 is at the proper distance from the image capture device and/or the calibration pattern 502 is at proper position within the image 500.

Figure 6:
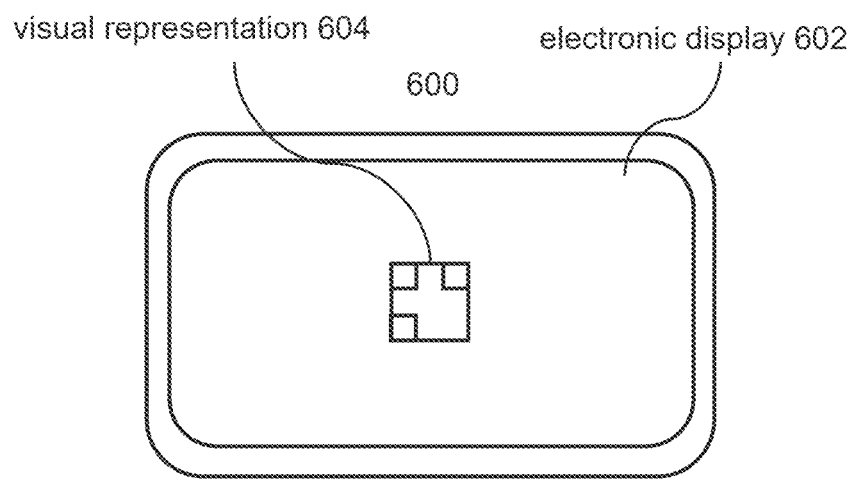
FIG. 6 illustrates an example visual representation of a machine-readable optical code presented on an electronic display.

FIG. 6 illustrates an example visual representation of a machine-readable optical code presented on an electronic display. An image capture device 600 may include an electronic display 602. A visual representation 604 of a machine-readable optical code may be presented on the electronic display 602. In some implementations, the visual representation 604 of the machine-readable optical code may be presented on the electronic display 602 responsive to detection of a machine-readable optical code depicted within the visual content captured by the image capture device 600.

The visual representation 604 of the machine-readable optical code may provide visual cues on how the machine-readable optical code should look within the visual content captured by the image capture device. The visual representation 604 of the machine-readable optical code may provide visual cues on how the image capture device 600 should be oriented with respect to the machine-readable optical code. For example, the visual representation 604 may include an outline of the machine-readable optical code. The visual representation 604 may include an outline of the exterior and one or more parts of the machine-readable optical code.

Adjusting the orientation of the image capture device 600 to the machine-readable optical code so that the depiction of the machine-readable optical code within the visual content is presented within/aligned with the visual representation 604 may result in proper orientation of the image capture device 600 to the machine-readable optical code. Adjusting the orientation of the image capture device 600 to the machine-readable optical code so that the depiction of the machine-readable optical code within the visual content is presented within/aligned with the visual representation 604 may result in proper orientation of the image capture device 600 to information presented with the machine-readable optical code (e.g., calibration pattern). Other types of visual representation and other positioning of visual representation are contemplated.

The calibration component 104 may be configured to perform lens calibration for the image capture device. The calibration component 104 may be configured to perform lens calibration for visual content capture by the image capture device. The image capture device may be calibrated to capture visual content through combination of the lens(es) of the image capture device and other lens(es) attached over the lens(es) of the image capture device. The calibration component 104 may be configured to change between saved lens calibration for the image capture device (e.g., lens calibration for lens(es) of the image capture device, lens calibration for different lens(es) attached over the lens(es) of the image capture device).

Lens calibration may include determination of optical properties of lens(es) through which visual content is captured by the image capture device. Lens calibration may include setting/changing values of calibration parameters for the image capture device. Lens calibration may include geometric calibration, which may estimate the parameters of the lenses and the image sensor used to capture visual content. For example, the lens calibration for visual content capture may include determination of lens parameters for capture of the visual content through the combination of the lens(es) of the image capture device and the other lens(es) attached over the lens(es) of the image capture device. Lens parameters may refer to extrinsic parameters, intrinsic parameters, and/or image capture device matrix based on the extrinsic parameters (representing rigid transformation from 3D world coordinate system to 3D image capture device's coordinate system, such as rotation and translation) and intrinsic parameters (representing projective transformation from 3D image capture device's coordinates into 2D image coordinates, such as focal length, optical element, skew coefficient). For example, lens parameters may include distortion coefficients, calibration polynomials, calibration polynomial coefficients, and/or other values/functions that describe how visual content is captured through the combination of the lens(es) of the image capture device and other lens(es) attached over the lens(es) of the image capture device.

The lens calibration may be performed based on the information for lens calibration conveyed by the machine-readable optical code(s) and/or other information. The information for lens calibration conveyed by the machine-readable optical code(s) may prompt/cause the lens calibration to be performed. For example, the information for lens calibration conveyed by the machine-readable optical code(s) may instruct the image capture device to automatically perform the lens calibration, instruct the image capture device to prompt the user on whether the lens calibration should be performed, and/or provide information to the image capture device on how the lens calibration should be performed. The results of the lens calibration (e.g., lens parameter values) may be saved in memory (e.g., the electronic storage 13) for the specific combination of lenses. The stored results of the lens calibration may be used (e.g., via user selection through one or more menus) to enable use of other lens(es) attached over the lens(es) of the image capture device without performing the lens calibration again.

The dynamic calibration of the image capture device may enable the image capture device to perform/function properly with other lens(es) attached over the lens(es) of the image capture device. For example, the lens calibration for visual content capture may include determination of lens parameters for stabilization, horizon leveling, and/or rolling shutter correction. Values of lens parameters determined via the lens calibration may be used to perform stabilization, horizon leveling, and/or rolling shutter correction for visual content captured by the image capture device. Values of lens parameters determined via the lens calibration may enable stabilization, horizon leveling, and/or rolling shutter correction to be performed accurately for the visual content captured through the combination of lenses.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13 and the image sensor 15 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
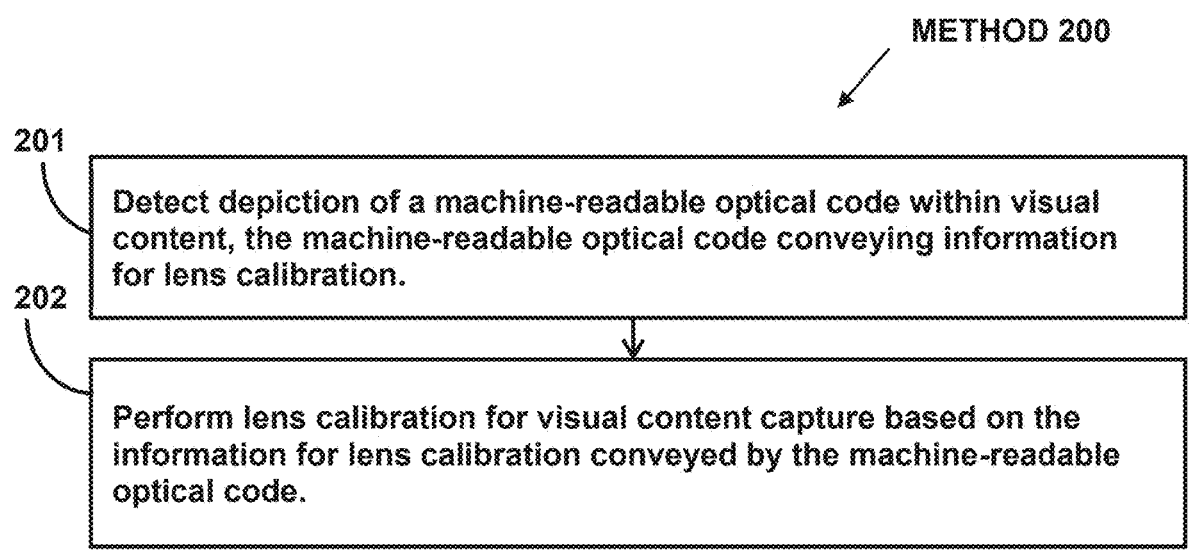
FIG. 2 illustrates an example method for dynamic lens calibration.

FIG. 2 illustrates method 200 for dynamic lens calibration. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of a lens, an image sensor, a processor, and/or other components. The lens may guide light within a field of view to the image sensor. The lens may have a focus distance. The image sensor may generate a visual output signal conveying visual information defining visual content based on light that becomes incident thereon.

At operation 201, depiction of a machine-readable optical code within the visual content may be detected. The machine-readable optical code may convey information for lens calibration with another lens attached over the lens. Attachment of the other lens over the lens may result in a different focus distance. In some implementations, operation 201 may be performed by a processor component the same as or similar to the detection component 102 (Shown in FIG. 1 and described herein).

At operation 202, lens calibration for visual content capture may be performed based on the information for lens calibration conveyed by the machine-readable optical code and/or other information. In some implementations, operation 202 may be performed by a processor component the same as or similar to the calibration component 104 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device for dynamic lens calibration, the image capture device comprising:
a housing;
a first lens carried by the housing and configured to guide light within a field of view to an image sensor, the first lens having a first focus distance, wherein the first lens includes a wide-angle lens and the first focus distance of the lens is a minimum focusing distance;
the image sensor carried by the housing and configured to generate a visual output signal conveying visual information based on light that becomes incident thereon, the visual information defining visual content having the field of view;
one or more physical processors carried by the housing and configured by machine-readable instructions to:
detect depiction of a machine-readable optical code within the visual content, the machine-readable optical code conveying information for lens calibration with a second lens attached over the first lens, wherein attachment of the second lens over the first lens results in a second focus distance different from the first focus distance, the second focus distance being shorter than the first focus distance; and
perform lens calibration for visual content capture based on the information for lens calibration conveyed by the machine-readable optical code;
wherein the image capture device further comprises an electronic display, wherein a visual representation for the machine-readable optical code is presented on the electronic display to facilitate orientation of the housing to the machine-readable optical code, the orientation of the housing to the machine-readable optical code including distance between the housing and the machine-readable optical code and rotation of the housing with respect to the machine-readable optical code.

2. The image capture device of claim 1, wherein the lens calibration for visual content capture includes determination of lens parameters for capture of the visual content through a combination of the first lens and the second lens.

3. The image capture device of claim 1, wherein the lens calibration for visual content capture includes determination of lens parameters for stabilization, horizon leveling, and/or rolling shutter correction.

4. The image capture device of claim 1, wherein the machine-readable optical code includes a QR code.

5. An image capture device for dynamic lens calibration, the image capture device comprising:
a housing;
a first lens carried by the housing and configured to guide light within a field of view to an image sensor, the first lens having a first focus distance;
the image sensor carried by the housing and configured to generate a visual output signal conveying visual information based on light that becomes incident thereon, the visual information defining visual content having the field of view;
one or more physical processors carried by the housing and configured by machine-readable instructions to:
detect depiction of a machine-readable optical code within the visual content, the machine-readable optical code conveying information for lens calibration with a second lens attached over the first lens, wherein attachment of the second lens over the first lens results in a second focus distance different from the first focus distance; and
perform lens calibration for visual content capture based on the information for lens calibration conveyed by the machine-readable optical code;
wherein the image capture device further comprises an electronic display, wherein a visual representation for the machine-readable optical code is presented on the electronic display to facilitate orientation of the housing to the machine-readable optical code.

6. The image capture device of claim 5, wherein the first focus distance of the lens is a minimum focusing distance.

7. The image capture device of claim 5, wherein the second focus distance is shorter than the first focus distance.

8. The image capture device of claim 5, wherein the first lens includes a wide-angle lens.

9. The image capture device of claim 5, wherein the orientation of the housing to the machine-readable optical code includes distance between the housing and the machine-readable optical code and rotation of the housing with respect to the machine-readable optical code.

10. The image capture device of claim 5, wherein the lens calibration for visual content capture includes determination of lens parameters for capture of the visual content through a combination of the first lens and the second lens.

11. The image capture device of claim 5, wherein the lens calibration for visual content capture includes determination of lens parameters for stabilization, horizon leveling, and/or rolling shutter correction.

12. The image capture device of claim 5, wherein the machine-readable optical code includes a QR code.

13. A method for dynamic lens calibration, the method performed by an image capture device, the image capture device including one or more processors, an image sensor, and a first lens, the image sensor configured to generate a visual output signal conveying visual information based on light that becomes incident thereon, the visual information defining visual content, the first lens configured to guide light within a field of view to the image sensor, the first lens having a first focus distance, the method comprising:
detecting depiction of a machine-readable optical code within the visual content, the machine-readable optical code conveying information for lens calibration with a second lens attached over the first lens, wherein attachment of the second lens over the first lens results in a second focus distance different from the first focus distance; and
performing lens calibration for visual content capture based on the information for lens calibration conveyed by the machine-readable optical code;
wherein the image capture device further includes an electronic display and a visual representation for the machine-readable optical code is presented on the electronic display to facilitate orientation of the image capture device to the machine-readable optical code.

14. The method of claim 13, wherein the first focus distance of the lens is a minimum focusing distance.

15. The method of claim 13, wherein the second focus distance is shorter than the first focus distance.

16. The method of claim 13, wherein the first lens includes a wide-angle lens.

17. The method of claim 13, wherein the orientation of the image capture device to the machine-readable optical code includes distance between the image capture device and the machine-readable optical code and rotation of the image capture device with respect to the machine-readable optical code.

18. The method of claim 13, wherein the lens calibration for visual content capture includes determination of lens parameters for capture of the visual content through a combination of the first lens and the second lens.

19. The method of claim 13, wherein the lens calibration for visual content capture includes determination of lens parameters for stabilization, horizon leveling, and/or rolling shutter correction.

20. The method of claim 13, wherein the machine-readable optical code includes a QR code.

\* \* \* \* \*